M. DOLOUKHANOFF.
DEVICE FOR AUTOMATICALLY CONTROLLING THE OUTPUT OF ELECTRICAL PLANTS.
APPLICATION FILED MAR. 23, 1922.
1,423,839. Patented July 25, 1922.
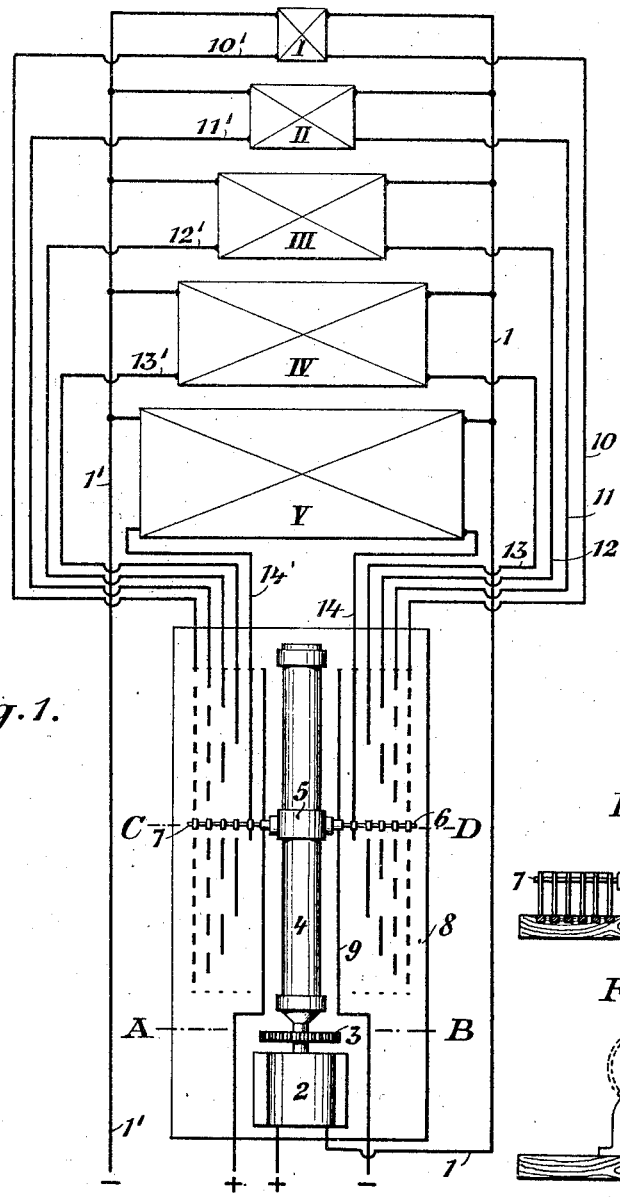
INVENTOR
Michel Doloukhanoff
BY ATTORNEY

UNITED STATES PATENT OFFICE.

MICHEL DOLOUKHANOFF, OF CHARLOTTENBURG, GERMANY.

DEVICE FOR AUTOMATICALLY CONTROLLING THE OUTPUT OF ELECTRICAL PLANTS.

1,423,839.  Specification of Letters Patent.  Patented July 25, 1922.

Application filed March 23, 1922. Serial No. 546,201.

*To all whom it may concern:*

Be it known that I, MICHEL DOLOUK-HANOFF, citizen of Russia, residing at Charlottenburg, Germany, have invented certain new and useful Improvements in Devices for Automatically Controlling the Output of Electrical Plants (for which I have filed an application in Germany March 5, 1920), of which the following is a specification.

It is known that the effective power of machines, motors, transformers and so on is more reduced, the more, or less, the power developed by them is deviated from the power standard, for which they were designed, that is to say, from their normal output. For instance, an electrical transformer of 100 kilowatts will yield at a 100 kilowatts load an effective power of 97%, at 60 kilowatts load 96%, at 20 kilowatts load 91%, at 10 kilowatts load 83.3% and finally at 1 kilowatt load 52%. A number of transformers of 10, 5, 2 and 1 kilowatts, whose highest yield in effective power (at full load) is about 90 to 91%, will yield only from 55 to 60% in effective power at varying loads, as these are generally customary in conductors for electrical lighting.

On the basis of these considerations it has been suggested to employ in lieu of a machine designed for a maximum demand, several of them which are connected up in such a manner that the number of the connected machines will about answer the demand for the time being. Arrangements have been proposed that allow of increasing automatically the number of the machines employed, for instance, power-transformers, according to the demand, in that as the demand for power is increased, the various transformers are connected progressively and in that they are disconnected again in a reverse way, if the demand is decreased, that is to say, the grouping is simply effected by adding up the elements and the number of groupings which cannot exceed that of the elements. Those groupings whose power shall increase after the natural series of numbers 1—$n$ are possible only, if elements of equal strength are employed.

Consequently each grouping would only show that degree of total effect, which a fully utilized unity shows.

The present invention however permits the arrangement of sources of current of various capacities, not only by adding or cutting out, but also by simultaneously cutting out or adding in such a manner, that the number of groupings possible with $n$ elements will be equal to $2^n-1$, and for that reason will always be higher than that possible with the known arrangements. By such a grouping a degree of total effect is obtained, which will not materially differ from the effect of the greatest and fully utilized unity available each time in such grouping.

Suppose for instance, between two sucessive groups of transformers there is a margin of 1 kilowatt and suppose that it is desired to utilize all forces between 1 and 7 kilowatts, with the known arrangement consisting of equal units, 7 transformers of 1 kilowatt each are required. In this arrangement the degree of total effect attainable will be equal to that of one 1 kilowatt transformer. With the arrangement according to the present invention however, three transformers will suffice, having a power of 1, 2 and 4 kilowatts, and the whole series of the seven desired power standards can be obtained by the following groupings, viz:

| 1 | 2 | 3 | 4 | 5 | 6 | 7 |
|---|---|---|---|---|---|---|
| A | B | AB | C | AC | BC | ABC |
| 1 | 2 | 1,2 | 4 | 1,4 | 2,4 | 1,2,4. |

Thus only the grouping 1 possesses the degree of effect of the standard transformer, groups 2 and 3 possess about that of 2 kilowatts and the others about that of the 4 kilowatts transformer.

All these combinations are obtainable only in consequence of the possibility of carrying out such grouping by adding or simultaneously cutting out; for in fact with a system in which grouping is effected in a known manner only by addition, merely the following groupings corresponding to the respective power of 1, 3 and 7 kilowatts are possible.

| 1 | 3 | 7 |
|---|---|---|
| A | A,B | A B C |
| 1 | 1,2 | 1,2,4. |

These groups would not work economically at all intermediate loads.

If it is desired to establish an electrical plant according to the invention, whose power will vary between 1 or 127 kilowatts, 7 separate transformers of 1, 2, 4, 8, 16, 32 and 64 kilowatts capacity are employed. If all these transformers are connected in multiple circuit, 127 kilowatts can be used. However, if arranged in proper manner, all power standards between 1 and 127 kilowatts would be obtainable, because the margin between each standard and the sum of the previous one will be 1 kilowatt each. If, for instance, at a given moment the plant requires 74 kilowatts, it will suffice to connect the 64, 8 and 2 kilowatt transformers.

If it should become necessary to control the margin of the succeeding powers by ½ kilowatt, it would be sufficient to add one single transformer of ½ kilowatt to the plant. If the power of the plant is to be doubled, it would suffice to add one single transformer of 128 kilowatts.

In order to obtain the desired result it will suffice that the various transformers possess the same power, which after a geometrical progression passes with the ratio 2, and whose first member corresponds to the desired power margin, and whose algebraic sum corresponds to the highest power required of the plant. It is obvious that in special circumstances the ratio of such progression may be other than 2, and that at times it may even change.

In the drawings a mode of execution according to the invention is illustrated as applied to electrical transformers, in which the grouping is effected automatically.

Fig. 1 is a wiring diagram of the plant.
Fig. 2 a section on line A—B in Fig. 1.
Fig. 3 is a section on line C—D in Fig. 1, and
Fig. 4 is a longitudinal section through the rods 10—14 of Fig. 1.

The five transformers I, II, III, IV and V of suitable capacity are connected with the positive pole of the secondary circuit by means of the cable 1, and the circuit is conducted through a measuring apparatus. A wheel gearing 3 drives a shaft 4 provided with a screw thread, on which latter the nut 5 travels. Said nut 5 has two arms 6 and 7 carrying brushes, that slide over metal rods 9 to 14, which latter are rigidly secured in a frame 8 of non-conducting material. The said brushes of arm 6 conduct the secondary current and those of arm 7 the primary current.

The negative pole of the secondary circuit is connected with the rod 9, on which rests the corresponding brush of arm 6 at all times. The other rods corresponding with the brushes, are connected by means of wires 10 to 14 with the negative poles of the transformers.

These various rods are interrupted at certain places by insulating material. The lengths of the rod sections $a$ (Fig. 4) and their interspaces $b$ depend on the selected progression of output. If a geometrical progression is used, whose ratio is 2 and if the apparatus 2 indicating the load, is provided with corresponding conductors then the lengths of the rod sections and that of the intermediate spaces are equal to each other for each rod. These lengths will increase from one rod to the adjacent one after the same progression, as the capacities connected with these rods, in the present case in proportion from 1:2.

In the event of selecting a progression of the ratio 3 the intermediate space would be twice as long as the rod section and the length of the sections would grow in proportion of 1:3:9:27 and so on.

The contact places of the rods secured in the frame 8 are arranged in such a manner, that the screw nut travelling on the shaft 4 will gradually touch the following contact points, viz: 10; 11; 10 and 11; 12; 10 and 12; 11 and 12; 10, 11 and 12; 13; 10 and 13; 11 and 13; 10, 11 and 13; 12 and 13; 10, 12 and 13; 11, 12 and 13; 10, 11, 12 and 13; 14 and so on up to 10, 11, 12, 13 and 14 in such a way that all possible connections of the 5 rods and also of the 5 transformers are possible.

As these groupings I; II; I and II; III; I and III and so on are gradually introduced into the circuit, the power of the groupings will gradually change according to the natural series of the numbers, wherewith the unity corresponds with the power of the transformer I.

Since all brushes on the same arm are interconnected, the primary or secondary circuits of a transformer element or a combination of these transformers are always closed according to the adjustment of the device 2 after the value of the power demand in the conductors, and in consequence the corresponding transformer elements will be in operation. When the load in the conductors leading to the places of consumption is zero, arms 6 and 7 are in the beginning of the switching device and the transformer of smallest energy works in the circuit.

It is obvious that the rods of the various transformer elements must not be arranged in straight lines and parallel but they must be arranged along concentric arcs or any kind of curves, while care must be taken that nut 5 will execute the corresponding rotations.

Sometimes it may be advantageous in practice not to introduce certain intermediate transformers, but to connect them directly as in the example illustrated with the transformers I, IV and V and so on.

I claim:

1. Apparatus for automatically controlling electric plants, comprising transformers of different capacities arranged in parallel; a measuring device in series with the secondary circuit of said tranformers; a double switch, one switch element being in circuit with the primary circuit and the other switch element in circuit with the secondary circuit, said double switch comprising contacts in the path of the switch elements arranged to control the output from the transformers in any predetermined series and means operated by the measuring device for operating said switch in any predetermined series.

2. Apparatus for automatically controlling electric plants, comprising transformers of different capacities arranged in parallel; a measuring device in series with the secondary circuits of said transformers and provided with a shaft; a double switch arm operated by said shaft, one switch arm controlling the primary circuit and the other switch arm controlling the secondary circuit of said transformers; and a frame having contacts embedded therein adapted to close the respective circuits, said contacts being arranged in the path of the switch arm to cause the current output from the transformers to vary according to any predetermined series.

3. Apparatus for automatically controlling electric plants, comprising transformers of different capacities connected in parallel; a measuring device in series with the secondary circuits of said transformers and provided with a shaft; a double switch arm connected to and operated by said shaft, one arm controlling the primary and the other controlling the secondary circuit; and a frame having contacts embedded therein arranged to control the output from the transformers, said contacts being arranged in the path of the switch arm and spaced at such intervals that the output of the transformers are varied in any predetermined series.

4. Apparatus for automatically controlling electric plants, comprising transformers of different capacities connected in parallel; a measuring device in series with the secondary circuits of said transformers and provided with a shaft; a double switch arm operated by said shaft, one switch arm controlling the primary circuit and the other switch arm controlling the secondary circuit of said transformers; and a frame having contacts embedded and spaced at such intervals in the frame to cause the output of current from the transformers to be varied according to any predetermined series, said switch arms being arranged in the path of the contacts and being normally closed to at least one of said transformers.

5. Apparatus for automatically controlling electric plants, comprising translating devices having different outputs arranged in parallel and including at least two circuits; a measuring device in series with one of the circuits of said devices; a double switch, each switch being in circuit with one of the circuits of said devices; and means operated by the measuring device for operating said switch in any predetermined series.

In testimony whereof I have affixed my signature.

MICHEL DOLOUKHANOFF.

Witnesses:
OSCAR SEROPINOMEZ,
ALWIN HAUSCATANN.